No. 872,661. PATENTED DEC. 3, 1907.
G. MACLOSKIE.
BRAKE LEVERAGE SYSTEM.
APPLICATION FILED APR. 25, 1907.
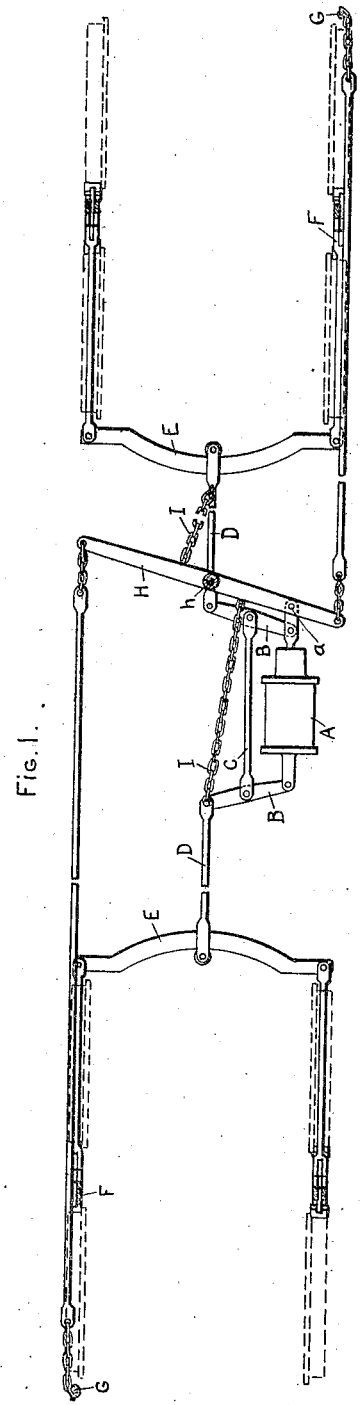
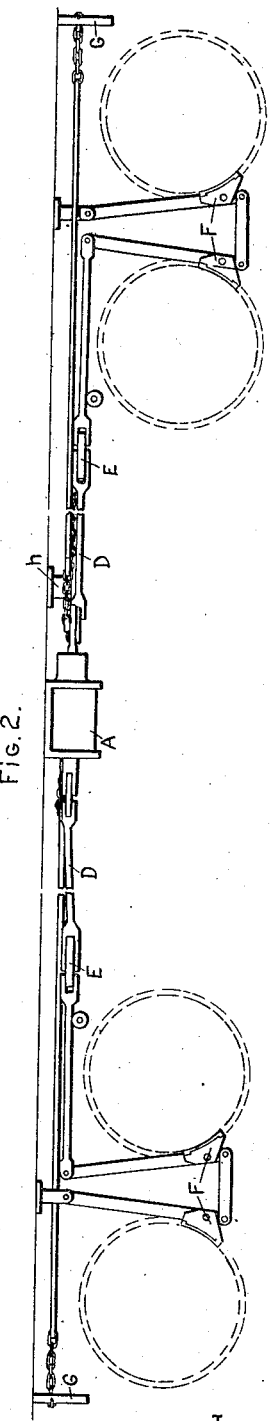
Witnesses:
Irving E. Steer.
J. Ellis Glen.
Inventor:
George Macloskie,
by Albert G. Davis
Att'y.

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

BRAKE-LEVERAGE SYSTEM.

No. 872,661.　　　　Specification of Letters Patent.　　　　Patented Dec. 3, 1907.

Application filed April 25, 1907. Serial No. 370,180.

*To all whom it may concern:*

Be it known that I, GEORGE MACLOSKIE, a citizen of the United States, residing at Schenectady, county of Schenectady, State of New York, have invented certain new and useful Improvements in Brake - Leverage Systems, of which the following is a specification.

My invention relates to brake leverage systems, and is particularly applicable to combined air and hand brakes such as are ordinarily employed on electric cars, and its object is to increase the reliability of such systems.

The piston of an air brake cylinder is ordinarily connected to the brake shoes through an equalizing leverage system comprising brake cylinder levers connected to each other by a tie rod and each connected to a truck rod for pulling the brake shoes against the wheels. When hand brakes are employed in addition to the air brakes, as is customary on electric cars, and when it is desired to secure equalization of brake shoe pressure in hand operation, the hand brake spindle is frequently connected to the same leverage system that transmits the pressure from the brake cylinder piston to the brake shoes. In such systems as ordinarily arranged, a broken tie rod, truck rod, cylinder lever, or connecting pin between these parts, renders both the hand and air brakes wholly inoperative, and accidents have resulted from such breakage. By my invention I so arrange the system that any one of the above-mentioned parts may break without destroying the control of the brakes, either by hand or by air pressure. I accomplish this by providing operative connections between the brake cylinder piston and brake shoes independent of the equalizing leverage system, so that the only effect of a break in the equalizing leverage system is to destroy the equalizing effect without rendering the brakes inoperative.

My invention will best be understood by reference to the accompanying drawing, in which Figure 1 shows a plan view; and Fig. 2 a side elevation of a brake leverage system arranged in accordance with my invention.

In the drawings A represents the brake cylinder, the pipe connections of which are not shown.

B B represent the brake cylinder levers, C the tie-rod, and D D the truck rods, arranged and connected to each other in the usual manner. Truck rods D D engage the circle bars E E which are connected to the brake shoes F in any suitable manner.

G G represent the hand brake staffs which are connected to the ends of a lever H having a fixed fulcrum at $h$. This lever is connected to the brake piston at $a$ by a rigid connection instead of by the chain usually employed. The truck rods D D are also connected by chains I I to points on the lever H on opposite sides of its fulcrum.

With the system thus arranged it will be seen that a break may occur in the tie-rod C, in either cylinder lever B, or in either truck rod D, without rendering the brakes inoperative either by hand or by air. For instance, if the tie-rod C should break, the brakes could be pneumatically operated by the thrust of the piston transmitted through the rigid connection $a$ to the lever H, which would exert a pull through the chains I I on both the truck rods D D. The pressures on the brake shoes of the two trucks will of course not be equalized under these conditions but the brakes will be effectively applied on at least one of the trucks. The brakes can also be operated by hand through the lever H and chains I I.

If either brake cylinder lever B breaks, the effect on the operation is precisely the same as though the tie-rod broke, that is, the equalizing feature of the operation is destroyed; but otherwise the brake application, either by air or by hand, is not interfered with. If one of the truck rods D breaks, the brakes for one truck are rendered inoperative but the brakes of the other truck may be applied either by air or by hand through the lever H and the chain I connected to the truck rod for that truck. A broken pin in the connections between the brake cylinder levers, tie-rod, and truck rods, or between the levers and the brake cylinder piston can have only the same effect as a break in the levers, tie-rod, or truck rods themselves. In short, the system is so arranged that a break anywhere in the equalizing leverage system simply destroys the equalizing feature and does not otherwise interfere with the application of the brakes either by air or by hand.

What I claim as new, and desire to secure by Letters Patent of the United States, is,—

1. In a brake leverage system, in combination with the brake cylinder, cylinder levers, tie-rod, and brake shoes actuated thereby, operative connections from the brake cylinder piston to brake shoes independent of said levers and tie-rod.

2. In a brake leverage system, in combination with the brake cylinder, cylinder levers, tie-rod, and brake shoes actuated thereby, operative connections from the brake cylinder piston to the brake shoes independent of said levers and tie-rod, and brake actuating means independent of the brake cylinder piston operatively connected both to said levers and to said independent connections.

3. In a brake leverage system, in combination with the brake cylinder, cylinder levers, tie-rod and brake shoes operated thereby, a lever having a fixed fulcrum, a connection from the brake cylinder piston to said lever, and connections from said lever to the brake shoes independent of the cylinder levers and tie-rod.

4. In a brake leverage system, in combination with the brake cylinder, cylinder levers, tie-rod, and brake shoes operated thereby, a lever having a fixed fulcrum, a connection from the brake cylinder piston to said lever, connections from said lever to the brake shoes independent of the cylinder levers and tie-rod, and actuating means for said lever independent of the brake cylinder piston.

5. In a brake leverage system, in combination with the brake cylinder, cylinder levers, tie-rod, and truck rods, a lever having a fixed fulcrum, a rigid connection between said lever and the brake cylinder piston, and chains connecting said lever to the truck rods.

6. In a brake leverage system, in combination with the brake cylinder, cylinder levers, tie-rod, and truck rods, a lever having a fixed fulcrum, a rigid connection between said lever and the brake cylinder piston, chains connecting said lever to the truck rods, and actuating means for said lever independent of the brake cylinder piston.

7. In a brake leverage system for combined air and hand brakes, in combination with the brake cylinder, cylinder levers, tie-rod, truck rods, hand brake spindle, and lever actuated by said hand spindle, a connection from said hand actuated lever to the cylinder levers, and independent connections from said lever to the truck rods.

8. In a brake leverage system, in combination with the brake cylinder, brake shoes, and equalizing leverage system connecting the brake cylinder piston to the shoes, operative connections between the piston and shoes independent of said equalizing leverage system.

9. In a brake leverage system, in combination with the brake cylinder, brake shoes, and equalizing leverage system connecting the brake cylinder piston to the shoes, operative connections between the piston and shoes independent of said equalizing leverage system, and brake actuating means independent of the brake cylinder piston operatively connected both to said equalizing leverage system and to said independent connections.

In witness whereof, I have hereunto set my hand this 23rd day of April, 1907.

GEORGE MACLOSKIE.

Witnesses:
BENJAMIN B. HULL,
HELEN ORFORD.